(12) United States Patent
Jones

(10) Patent No.: US 8,825,976 B1
(45) Date of Patent: Sep. 2, 2014

(54) HYBRID DRIVE EXECUTING BIASED MIGRATION POLICY DURING HOST BOOT TO MIGRATE DATA TO A NON-VOLATILE SEMICONDUCTOR MEMORY

(75) Inventor: Brian E. Jones, Ladera Ranch, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 515 days.

(21) Appl. No.: 12/892,775

(22) Filed: Sep. 28, 2010

(51) Int. Cl.
  *G06F 12/00* (2006.01)
  *G06F 13/00* (2006.01)
  *G06F 13/28* (2006.01)

(52) U.S. Cl.
  USPC .................... 711/165; 711/2; 711/112

(58) Field of Classification Search
  USPC .............................. 711/2, 112, 165
  See application file for complete search history.

(56) References Cited

U.S. PATENT DOCUMENTS

| | | | |
|---|---|---|---|
| 5,333,138 A | 7/1994 | Richards et al. | |
| 5,581,785 A | 12/1996 | Nakamura et al. | |
| 5,586,291 A | 12/1996 | Lasker et al. | |
| 6,044,439 A | 3/2000 | Ballard et al. | |
| 6,115,200 A | 9/2000 | Allen et al. | |
| 6,275,949 B1 | 8/2001 | Watanabe | |
| 6,429,990 B2 | 8/2002 | Serrano et al. | |
| 6,661,591 B1 | 12/2003 | Rothberg | |
| 6,662,267 B2 | 12/2003 | Stewart | |
| 6,687,850 B1 | 2/2004 | Rothberg | |
| 6,754,021 B2 | 6/2004 | Kisaka et al. | |
| 6,807,630 B2 | 10/2004 | Lay et al. | |
| 6,909,574 B2 | 6/2005 | Aikawa et al. | |
| 6,968,450 B1 * | 11/2005 | Rothberg et al. | 713/1 |
| 7,017,037 B2 | 3/2006 | Fortin et al. | |
| 7,028,174 B1 | 4/2006 | Atai-Azimi et al. | |
| 7,082,494 B1 | 7/2006 | Thelin et al. | |
| 7,107,444 B2 | 9/2006 | Fortin et al. | |
| 7,120,806 B1 | 10/2006 | Codilian et al. | |
| 7,142,385 B2 | 11/2006 | Shimotono et al. | |
| 7,334,082 B2 | 2/2008 | Grover et al. | |
| 7,395,452 B2 | 7/2008 | Nicholson et al. | |
| 7,411,757 B2 | 8/2008 | Chu et al. | |
| 7,461,202 B2 | 12/2008 | Forrer, Jr. et al. | |
| 7,472,222 B2 | 12/2008 | Auerbach et al. | |
| 7,477,477 B2 | 1/2009 | Maruchi et al. | |
| 7,509,471 B2 | 3/2009 | Gorobets | |
| 7,516,346 B2 | 4/2009 | Pinheiro et al. | |
| 7,610,438 B2 | 10/2009 | Lee et al. | |
| 7,613,876 B2 | 11/2009 | Bruce et al. | |

(Continued)

OTHER PUBLICATIONS

Hannes Payer, Marco A.A. Sanvido, Zvonimir Z. Bandic, Christoph M. Kirsch, "Combo Drive: Optimizing Cost and Performance in a Heterogeneous Storage Device", http://csl.cse.psu.edu/wish2009_papers/Payer.pdf, pp. 1-8.

(Continued)

*Primary Examiner* — Stephen Elmore
*Assistant Examiner* — Mark Giardino, Jr.

(57) ABSTRACT

A hybrid drive is disclosed comprising a head actuated over a disk comprising a plurality of data sectors, and a non-volatile semiconductor memory (NVSM) comprising a plurality of memory segments. A logical block address (LBA) is mapped to a data sector on the disk. During a bias interval following the start of a host boot operation, a biased migration policy is executed that increases a likelihood of migrating the LBA to the NVSM. After the bias interval a normal migration policy is executed.

28 Claims, 7 Drawing Sheets

(56) References Cited

U.S. PATENT DOCUMENTS

| | | |
|---|---|---|
| 7,644,231 B2 | 1/2010 | Recio et al. |
| 7,685,360 B1 | 3/2010 | Brunnett et al. |
| 7,752,491 B1 | 7/2010 | Liikanen et al. |
| 8,315,006 B1 | 11/2012 | Chahwan et al. |
| 2002/0083264 A1* | 6/2002 | Coulson ............ 711/112 |
| 2006/0195657 A1 | 8/2006 | Tien et al. |
| 2007/0028040 A1 | 2/2007 | Sinclair |
| 2008/0005462 A1* | 1/2008 | Pyeon et al. ............ 711/113 |
| 2008/0040537 A1 | 2/2008 | Kim |
| 2008/0059694 A1 | 3/2008 | Lee |
| 2008/0130156 A1 | 6/2008 | Chu et al. |
| 2008/0177938 A1 | 7/2008 | Yu |
| 2008/0222353 A1 | 9/2008 | Nam et al. |
| 2008/0256287 A1 | 10/2008 | Lee et al. |
| 2008/0307270 A1 | 12/2008 | Li |
| 2009/0019218 A1 | 1/2009 | Sinclair et al. |
| 2009/0031072 A1 | 1/2009 | Sartore |
| 2009/0103203 A1 | 4/2009 | Yoshida |
| 2009/0106518 A1 | 4/2009 | Dow |
| 2009/0144501 A2 | 6/2009 | Yim et al. |
| 2009/0150599 A1 | 6/2009 | Bennett |
| 2009/0172324 A1 | 7/2009 | Han et al. |
| 2009/0249168 A1 | 10/2009 | Inoue |
| 2009/0271562 A1 | 10/2009 | Sinclair |
| 2009/0327603 A1 | 12/2009 | McKean et al. |
| 2009/0327608 A1 | 12/2009 | Eschmann et al. |
| 2010/0088459 A1 | 4/2010 | Arya et al. |
| 2011/0138106 A1 | 6/2011 | Prabhakaran et al. |

OTHER PUBLICATIONS

Gokul Soundararajan, Vijayan Prabhakaran, Mahesh Balakrishan, Ted Wobber, "Extending SSD Lifetimes with Disk-Based Write Caches", http://research.microsoft.com/pubs/115352/hybrid.pdf, Feb. 2010, pp. 1-14.

Xiaojian Wu, A. L. Narasimha Reddy, "Managing Storage Space in a Flash and Disk Hybrid Storage System", http://www.ee.tamu.edu/~reddy/papers/mascots09.pdf, pp. 1-4.

Tao Xie, Deepthi Madathil, "SAIL: Self-Adaptive File Reallocation on Hybrid Disk Arrays", The 15th Annual IEEE International Conference on High Performance Computing (HiPC 2008), Bangalore, India, Dec. 17-20, 2008, pp. 1-12.

Non-Volatile Memory Host Controller Interface revision 1.0 specification available for download at http://www.intel.com/standards/nvmhci/index.htm. Ratified on Apr. 14, 2008, 65 pages.

Obr, Nathan, "ACS Coordinating Device Maintenance," Microsoft, Jun. 8, 2010, 6 pages.

Alain Chahwan, U.S. Appl. No. 12/720,568, filed Mar. 9, 2010, 22 pages.

* cited by examiner

HYBRID DRIVE EXECUTING BIASED MIGRATION POLICY DURING HOST BOOT TO MIGRATE DATA TO A NON-VOLATILE SEMICONDUCTOR MEMORY

BACKGROUND

Hybrid drives are conventional disk drives augmented with a non-volatile semiconductor memory (NVSM) such as a flash which helps improve certain aspects of the disk drive. For example, the non-volatile semiconductor memory may store boot data in order to expedite the boot operation of a host computer. Another use of a NVSM may be to store frequently accessed data and/or non-sequential data for which the access time is typically much shorter than the disk (which suffers from mechanical latency including seek and rotational latency). Other policies may reduce write amplification of the NVSM in order to maximize its longevity, such as storing frequently written data to the disk (or data having a write/read ratio that exceeds a predetermined threshold).

DETAILED DESCRIPTION OF EMBODIMENTS OF THE INVENTION

Figure 1A:
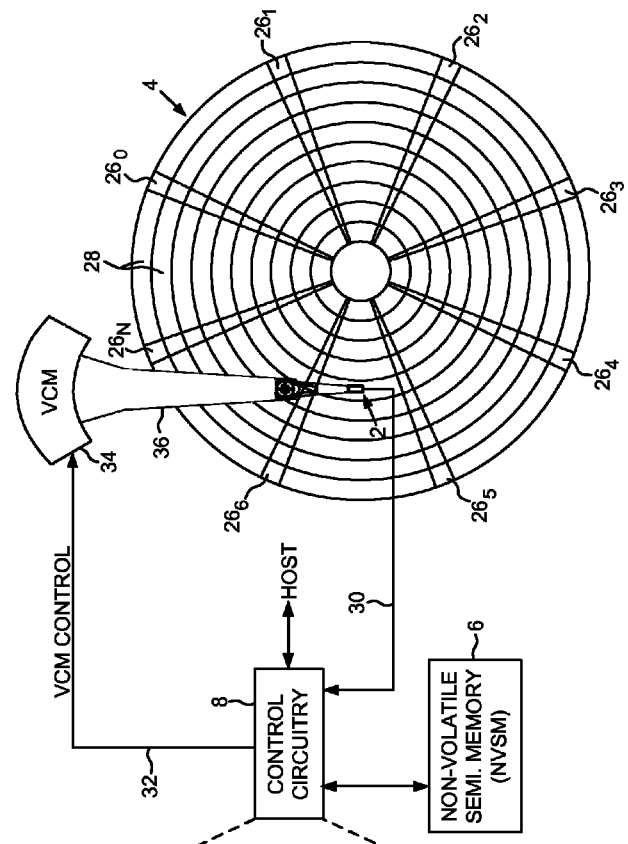
FIG. 1A shows a hybrid drive according to an embodiment of the present invention comprising a head actuated over a disk and a non-volatile semiconductor memory (NVSM).
Figure 1B:
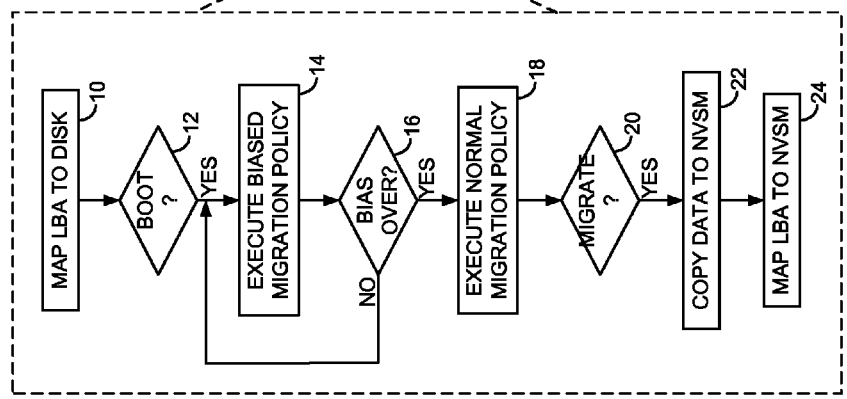
FIG. 1B is a flow diagram according to an embodiment of the present invention wherein a biased migration policy is executed during a bias interval after the start of a host boot operation in order to bias the migration of logical block addresses (LBAs) to the NVSM.

FIG. 1A shows a hybrid drive according to an embodiment of the present invention comprising a head 2 actuated over a disk 4 comprising a plurality of data sectors, and a non-volatile semiconductor memory (NVSM) 6 comprising a plurality of memory segments. The hybrid drive further comprises control circuitry 8 operable to execute the flow diagram of FIG. 1B wherein a logical block address (LBA) is mapped to a data sector on the disk (step 10). During a bias interval following the start of a host boot operation (step 12), a biased migration policy is executed that increases a likelihood of migrating the LBA to the NVSM (step 14). After the bias interval (step 16), a normal migration policy is executed (step 18). The LBA is migrated to the NVSM in response to normal and biased migration policies (step 20) by copying data stored in the data sector to a memory segment in the NVSM (step 22) and mapping the LBA to the memory segment in the NVSM (step 24).

In the embodiment of FIG. 1A, the disk 4 comprises a plurality of servo sectors $26_0$-$26_N$ that define a plurality of data tracks 28, wherein each data track comprises a plurality of the data sectors. The control circuitry 8 processes a read signal 30 to demodulate the servo sectors $26_0$-$26_N$ into a position error signal (PES). The PES is filtered with a suitable compensation filter to generate a control signal 32 applied to a voice coil 34 of a voice coil motor (VCM) which pivots an actuator arm 36 about a pivot to position the head 2 radially over the disk 4 in a direction that reduces the PES.

In one embodiment, the NVSM 6 exhibits less access latency compared to the disk 4 which is limited by the time needed to spin up, as well as the latency in seeking the head 2 to a target track and waiting for the disk 4 to rotate until the head 2 is over the first target data sector. Accordingly, in one embodiment a performance benefit may be achieved by migrating LBAs to the NVSM 6 that are accessed during a host boot operation, and in one embodiment, during an interval following the host boot operation. For example, a user will typically launch one or more applications after booting a computer system (e.g., Email, Browser, Address Book, etc.). Booting the operating system and launching applications typically involves reading the same sequence of LBAs from the hybrid drive. Consequently, a noticeable performance increase in booting a host system may be achieved if a number of the initially accessed LBAs are migrated from the disk 4 to the NVSM 6.

In order to conserve space and reduce write amplification of the NVSM 6, the LBAs selected for migration from the disk 4 to the NVSM 6 is based on a migration policy that weighs the cost/benefit of migrating an LBA to the NVSM. For example, in an embodiment described below, a read counter is maintained for each LBA (or range of LBAs). An LBA may be migrated to the NVSM 6 if the read counter exceeds a threshold (meaning that the LBA is read frequently and therefore migrating to the NVSM improves performance). In another embodiment, an LBA is migrated to the NVSM 6 if there is a high frequency of reads and a low ratio of writes/reads (which helps reduce write amplification of the NVSM). In one embodiment of the present invention, the read counter(s) are biased during a bias interval following the start of the host boot operation in order to bias the migration of LBAs to the NVSM, thereby improving performance each time a host system is booted. After the bias interval, the read counters are incremented normally so that LBAs are migrated to the NVSM at a slower rate.

Figure 2A:
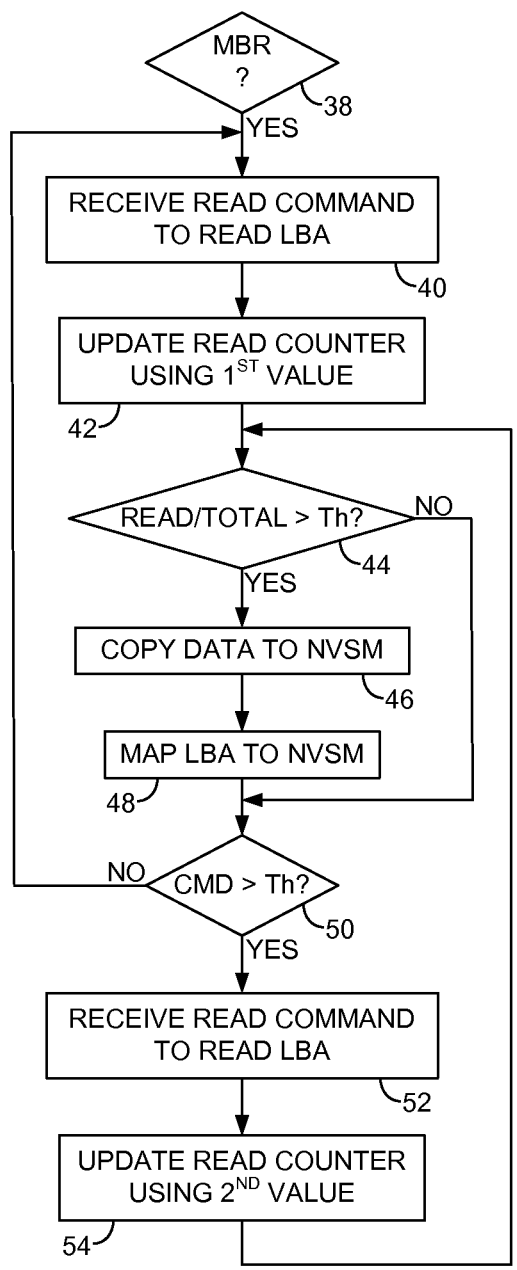
FIG. 2A is a flow diagram according to an embodiment of the present invention wherein the bias interval is based on a number of commands received after the start of the host boot operation.

FIG. 2A is a flow diagram according to an embodiment of the present invention wherein the control circuitry of the hybrid drive detects that the host boot operation is beginning (step 38) when a command to read a particular LBA is received (e.g., an LBA corresponding to a data sector storing a master boot record (MBR)). When a command is received to read an LBA during the bias interval (step 40), a corresponding read counter is updated using a first value (step 42). If a ratio of the read counter to a total number of reads exceeds a threshold (step 44), the data stored in the data sector is copied to the NVSM (step 46) and the LBA is mapped to the NVSM (step 48). In one embodiment, the total number of reads (step 44) may be the total number over the life of the hybrid drive, wherein the threshold (step 44) may be adjusted over the life of the hybrid drive. In another embodiment, the total number of reads (step 44) may represent a number of read commands received over a predetermined interval.

In the embodiment of FIG. 2A, the bias interval ends when a number of access commands (read and write) received from the host after the start of the boot operation exceeds a threshold (step 50). When a read command is received after the bias interval (step 52), the corresponding read counter is updated using a second value less than the first value (step 54), thereby decreasing the likelihood of migrating LBAs to the NVSM. In one embodiment, the read counters may continue to be incremented after migrating an LBA to the NVSM so that the read counter may be used to migrate the LBA back to the disk when appropriate.

Figure 2B:
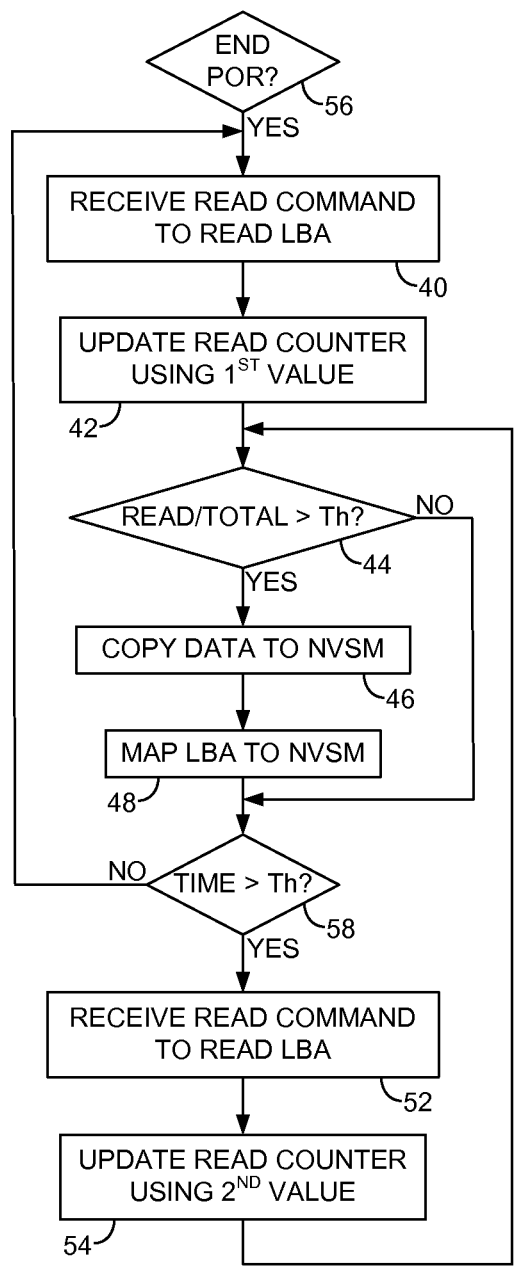
FIG. 2B is a flow diagram according to an embodiment of the present invention wherein the bias interval is based on a time interval after the start of the host boot operation.

FIG. 2B is a flow diagram according to an embodiment of the present invention wherein the beginning of the host boot operation is detected (step 56) after the control circuitry of the hybrid drive completes a power on reset (POR). Also in the embodiment of FIG. 2B, the bias interval ends (step 58) after a time interval expires (independent of the number of access commands received). Other embodiments may end the bias interval based on any suitable criteria, including a combination of criteria such as a number of access commands and a time interval.

Figure 3:
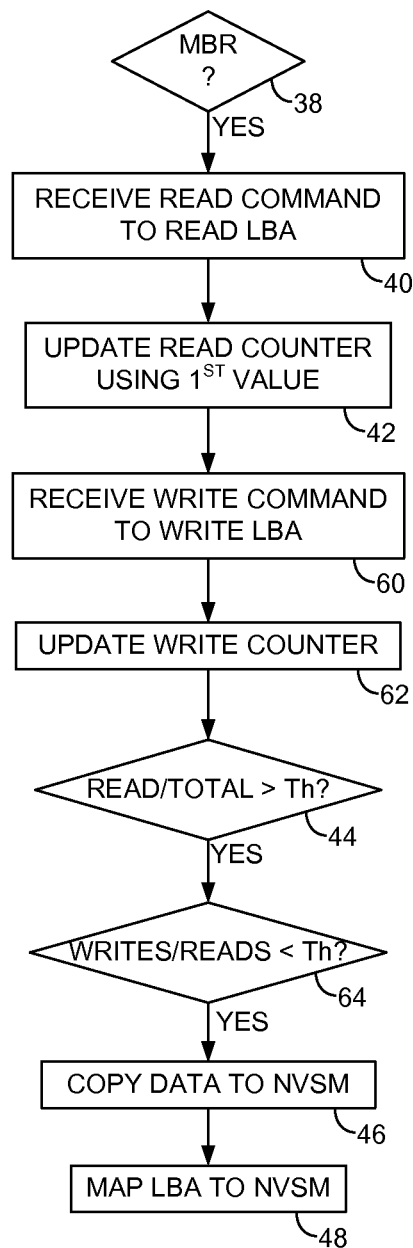
FIG. 3 is a flow diagram according to an embodiment of the present invention wherein the decision to migrate an LBA is based on a ratio of a write/read counters.

FIG. 3 is a flow diagram according to an embodiment of the present invention wherein when a write command is received (step 60), a write counter for the LBA is updated (step 62). When a ratio of the read counter to a total number of reads exceeds a threshold (step 44) and a ratio of writes/reads is less than a threshold (step 64), then the LBA is migrated to the NVSM by copying the data from the data sector (step 46) and updating the LBA mapping (step 48). This embodiment helps preserve the life of the NVSM by reducing write amplification (by decreasing the probability of migrating a frequently written LBA to the NVSM).

Figure 4A:
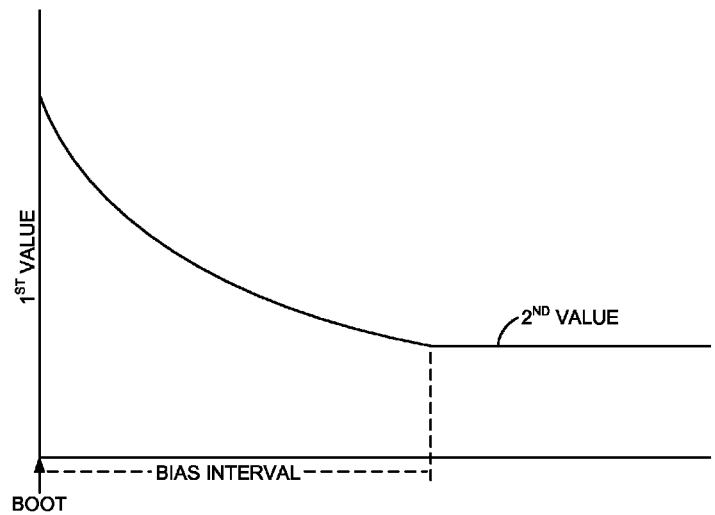
FIGS. 4A and 4B show embodiments of the present invention wherein the value for adjusting the read counter is adjusted during the bias interval.
Figure 4B:
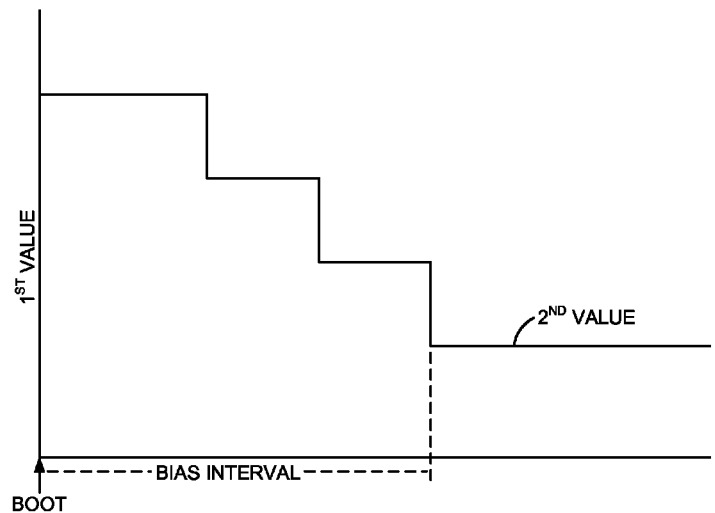

In one embodiment of the present invention the first value for updating the read counter is adjusted during the bias interval. FIG. 4A shows an example of this embodiment wherein the first value is gradually decreased during the bias interval so that LBAs that are read frequently toward the beginning of the bias interval are more likely to be migrated to the NVSM. For example, in one embodiment the first value may ensure that all (or many) of the operating system data sectors are migrated to the NVSM whereas a lesser percentage of data sectors corresponding to applications are migrated to the NVSM. The first value may be adjusted according to any suitable function. FIG. 4B shows an embodiment wherein the first value is adjusted in step increments during the bias interval until reaching the second value at the end of the bias interval. In an alternative embodiment to adjusting the first value, the threshold for comparing the read counter may instead be adjusted in order to change the bias of the migration during the bias interval.

Figure 5A:
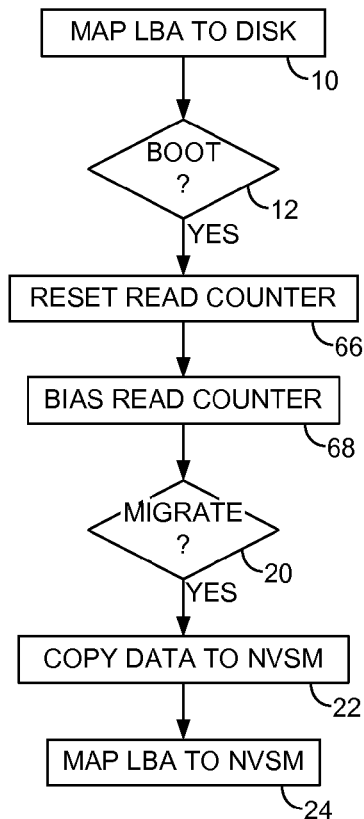
FIG. 5A is a flow diagram according to an embodiment of the present invention wherein the read counter is reset at the beginning of the host boot operation.
Figure 5B:
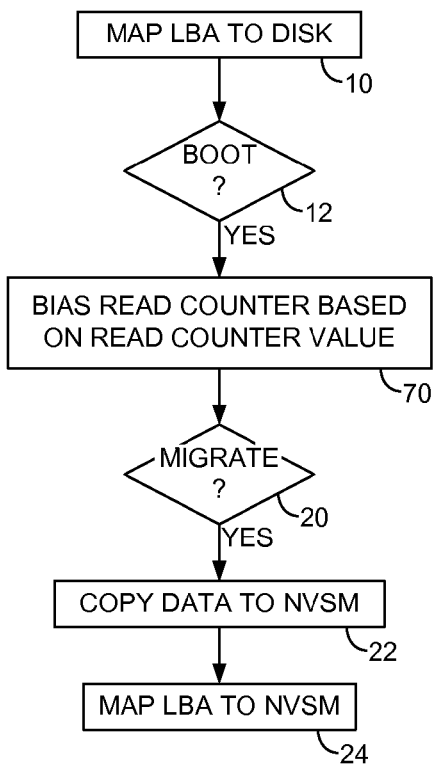
FIG. 5B is a flow diagram according to an embodiment of the present invention wherein the read counter is biased during the bias interval based on an initial value of the read counter at the beginning of the host boot operation.

FIG. 5A is a flow diagram according to an embodiment of the present invention wherein when a host boot operation is detected, the read counters for tracking the LBAs (or range of LBAs) are reset (step 66) so that the biasing of the read counters (step 68) is independent of the number of read operations performed prior to the boot operation. In an alternative embodiment shown in FIG. 5B, when a host boot operation is detected, the read counters are biased (step 70) based on the starting value for the read counters. For example, in one embodiment, the first value for incrementing a read counter may be based on the current value of the read counter at the start of the boot operation (thereby taking into account the read operations performed on the LBA prior to the boot operation).

Figure 6:
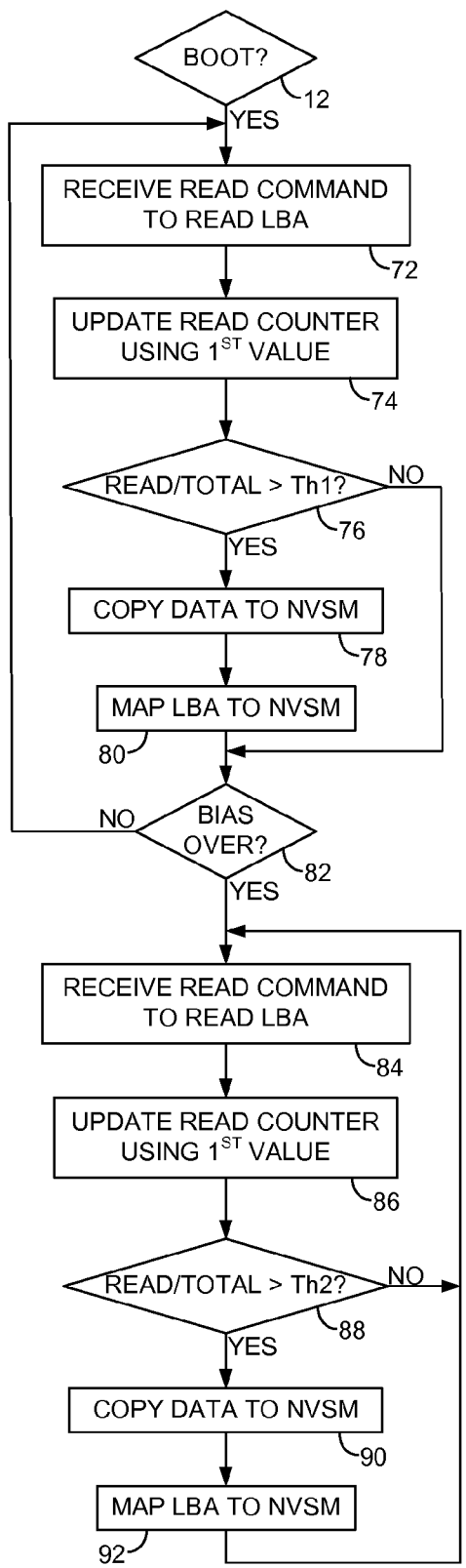
FIG. 6 is a flow diagram according to an embodiment of the present invention wherein the threshold for comparing the read counters is adjusted in order to bias the migration policy during the bias interval.

In the above embodiments, the biased migration policy is implemented by biasing the read counters during the bias interval. In an alternative embodiment, the threshold for comparing the read counters may be biased during the bias interval to determine whether to migrate an LBA to the NVSM. An example of this embodiment is illustrated in FIG. 6 wherein when a host boot operation is detected (step 12), and a read command is received during the bias interval (step 72), a corresponding read counter is updated using a first value (step 74). The read counter is then compared to a first threshold (step 76) to determine whether to migrate the LBA to the NVSM by copying the data (step 78) and mapping the LBA to the NVSM (step 80). After the bias interval (step 82), when a read command is received (step 84) the corresponding read counter is updated using the first value (step 86). The read counter is then compared to a second threshold (step 88) to determine whether to migrate the LBA to the NVSM by copying the data (step 90) and mapping the LBA to the NVSM (step 92). In one embodiment, the read counters are incremented and therefore the first threshold at step 76 is less than the second threshold at step 88 thereby increasing the likelihood of migrating an LBA to the NVSM if read during the bias interval.

Other embodiments of the present invention may consider other factors in addition to the read counters to determine whether to migrate an LBA to the NVSM. For example, in one embodiment long sequences of consecutive LBAs are biased more toward remaining mapped to the disk since the disk typically provides better performance when accessing consecutive sequences of LBAs. In general, the migration policy is biased during the bias interval after the start of a host boot operation to increase the probability of migrating LBAs to the NVSM, but an LBA may still remain mapped to the disk if dictated by the biased migration policy.

In one embodiment, the decision to migrate an LBA to the NVSM may be made by the migration policy each time the LBA is read. In an alternative embodiment, the decision to migrate an LBA to the NVSM may be made periodically after executing a number of read operations. For example, the control circuitry may evaluate the statistical history of the read commands (and optionally the write commands) in order to make a determination as to which LBAs should be migrated to the NVSM in order to achieve the best performance and/or longevity and/or free space for the NVSM.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller and/or NVSM controller, or certain steps described above may be performed by a read channel and others by a disk controller and/or NVSM controller. In one embodiment, the read channel and controllers are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the hybrid drive is powered on. In yet another embodiment, the control circuitry comprises suitable logic circuitry, such as state machine circuitry.

What is claimed is:

1. A hybrid drive comprising:
   a disk comprising a plurality of data sectors;
   a head actuated over the disk;
   a non-volatile semiconductor memory (NVSM) comprising a plurality of memory segments; and
   control circuitry operable to:
   map a logical block address (LBA) to a data sector on the disk;
   detect a start of a host boot operation;
   execute a biased migration policy during a bias interval following the start of the boot operation, wherein the biased migration policy increases a likelihood of migrating the LBA to the NVSM;
   execute a normal migration policy after the bias interval;
   migrate the LBA to the NVSM in response to the normal and biased migration policies by:
   copying data stored in the data sector to a memory segment in the NVSM; and
   mapping the LBA to the memory segment in the NVSM;
   maintain a read counter for the LBA; and
   bias the migration of the LBA to the NVSM during the bias interval based on the read counter.

2. The hybrid drive as recited in claim 1, wherein the control circuitry is further operable to:
   adjust the read counter by a first value each time the LBA is read during the bias interval;
   adjust the read counter by a second value each time the LBA is read after the bias interval; and
   migrate the LBA to the NVSM by comparing the read counter to a threshold.

3. The hybrid drive as recited in claim 2, wherein the control circuitry is further operable to adjust the first value as a function of a number of access commands executed after the start of the host boot operation.

4. The hybrid drive as recited in claim 3, wherein the control circuitry is further operable to reduce the first value as the number of access commands increases.

5. The hybrid drive as recited in claim 2, wherein the control circuitry is further operable to reset the read counter at the start of the host boot operation.

6. The hybrid drive as recited in claim 2, wherein the first value is based on a value of the read counter at the start of the host boot operation.

7. The hybrid drive as recited in claim 1, wherein the control circuitry is further operable to:
   migrate the LBA to the NVSM by comparing the read counter to a threshold, wherein the threshold is adjusted during the bias interval.

8. The hybrid drive as recited in claim 1, wherein the control circuitry is further operable to detect the start of the host boot operation when a command to read a master boot record is received from the host.

9. The hybrid drive as recited in claim 1, wherein the control circuitry is further operable to detect the start of the host boot operation after completing a power on reset.

10. The hybrid drive as recited in claim 1, wherein the bias interval comprises a predetermined number of access commands received from the host after the start of the host boot operation.

11. The hybrid drive as recited in claim 1, wherein the bias interval comprises a predetermined time interval after the start of the host boot operation.

12. The hybrid drive as recited in claim 1, wherein the control circuitry is further operable to migrate the LBA to the NVSM in response to a ratio of the read counter to a number of read commands received from the host.

13. The hybrid drive as recited in claim 12, wherein the control circuitry is further operable to:
    maintain a write counter for the LBA; and
    migrate the LBA to the NVSM in response to a ratio of the write counter to the read counter.

14. A method of operating a hybrid drive comprising a head actuated over a disk comprising a plurality of data sectors, and a non-volatile semiconductor memory (NVSM) comprising a plurality of memory segments, the method comprising:
    mapping a logical block address (LBA) to a data sector on the disk;
    detecting a start of a host boot operation;
    executing a biased migration policy during a bias interval following the start of the boot operation, wherein the biased migration policy increases a likelihood of migrating the LBA to the NVSM;
    executing a normal migration policy after the bias interval;
    migrating the LBA to the NVSM in response to the normal and biased migration policies by:
    copying data stored in the data sector to a memory segment in the NVSM; and
    mapping the LBA to the memory segment in the NVSM;
    maintaining a read counter for the LBA; and
    biasing the migration of the LBA to the NVSM during the bias interval based on the read counter.

15. The method as recited in claim 14, further comprising:
    adjusting the read counter by a first value each time the LBA is read during the bias interval;
    adjusting the read counter by a second value each time the LBA is read after the bias interval; and
    migrating the LBA to the NVSM by comparing the read counter to a threshold.

16. The method as recited in claim 15, further comprising adjusting the first value as a function of a number of access commands executed after the start of the host boot operation.

17. The method as recited in claim 16, further comprising reducing the first value as the number of access commands increases.

18. The method as recited in claim 15, further comprising resetting the read counter at the start of the host boot operation.

19. The method as recited in claim 15, wherein the first value is based on a value of the read counter at the start of the host boot operation.

20. The method as recited in claim 14, further comprising:
    migrating the LBA to the NVSM by comparing the read counter to a threshold, wherein the threshold is adjusted during the bias interval.

21. The method as recited in claim 14, further comprising detecting the start of the host boot operation when a command to read a master boot record is received from the host.

22. The method as recited in claim 14, further comprising detecting the start of the host boot operation after completing a power on reset.

23. The method as recited in claim 14, wherein the bias interval comprises a predetermined number of access commands received from the host after the start of the host boot operation.

24. The method as recited in claim 14, wherein the bias interval comprises a predetermined time interval after the start of the host boot operation.

25. The method as recited in claim 14, further comprising migrating the LBA to the NVSM in response to a ratio of the read counter to a number of read commands received from the host.

26. The method as recited in claim 25, further comprising:
maintaining a write counter for the LBA; and
migrating the LBA to the NVSM in response to a ratio of the write counter to the read counter.

27. A hybrid drive comprising:
a disk comprising a plurality of data sectors;
a head actuated over the disk;
a non-volatile semiconductor memory (NVSM) comprising a plurality of memory segments; and
control circuitry operable to:
map a logical block address (LBA) to a data sector on the disk;
detect a start of a host boot operation;
execute a first migration policy during a bias interval following the start of the boot operation, wherein the first migration policy increases a likelihood of migrating the LBA to the NVSM;
execute a second migration policy after the bias interval, wherein the second migration policy does not increase a likelihood of migrating the LBA to the NVSM;
migrate the LBA to the NVSM in response to the normal and biased migration policies by:
copying data stored in the data sector to a memory segment in the NVSM; and
mapping the LBA to the memory segment in the NVSM;
maintain a read counter for the LBA; and
bias the migration of the LBA to the NVSM during the bias interval based on the read counter.

28. A method of operating a hybrid drive comprising a head actuated over a disk comprising a plurality of data sectors, and a non-volatile semiconductor memory (NVSM) comprising a plurality of memory segments, the method comprising:
mapping a logical block address (LBA) to a data sector on the disk;
detecting a start of a host boot operation;
executing a first migration policy during a bias interval following the start of the boot operation, wherein the biased migration policy increases a likelihood of migrating the LBA to the NVSM;
executing a second migration policy after the bias interval, wherein the second migration policy does not increase a likelihood of migrating the LBA to the NVSM;
migrating the LBA to the NVSM in response to the normal and biased migration policies by:
copying data stored in the data sector to a memory segment in the NVSM; and
mapping the LBA to the memory segment in the NVSM;
maintaining a read counter for the LBA; and
biasing the migration of the LBA to the NVSM during the bias interval based on the read counter.

\* \* \* \* \*